July 12, 1927.
S. A. STEERE
CORD TIRE FABRIC
Filed Nov. 19, 1925
1,635,196
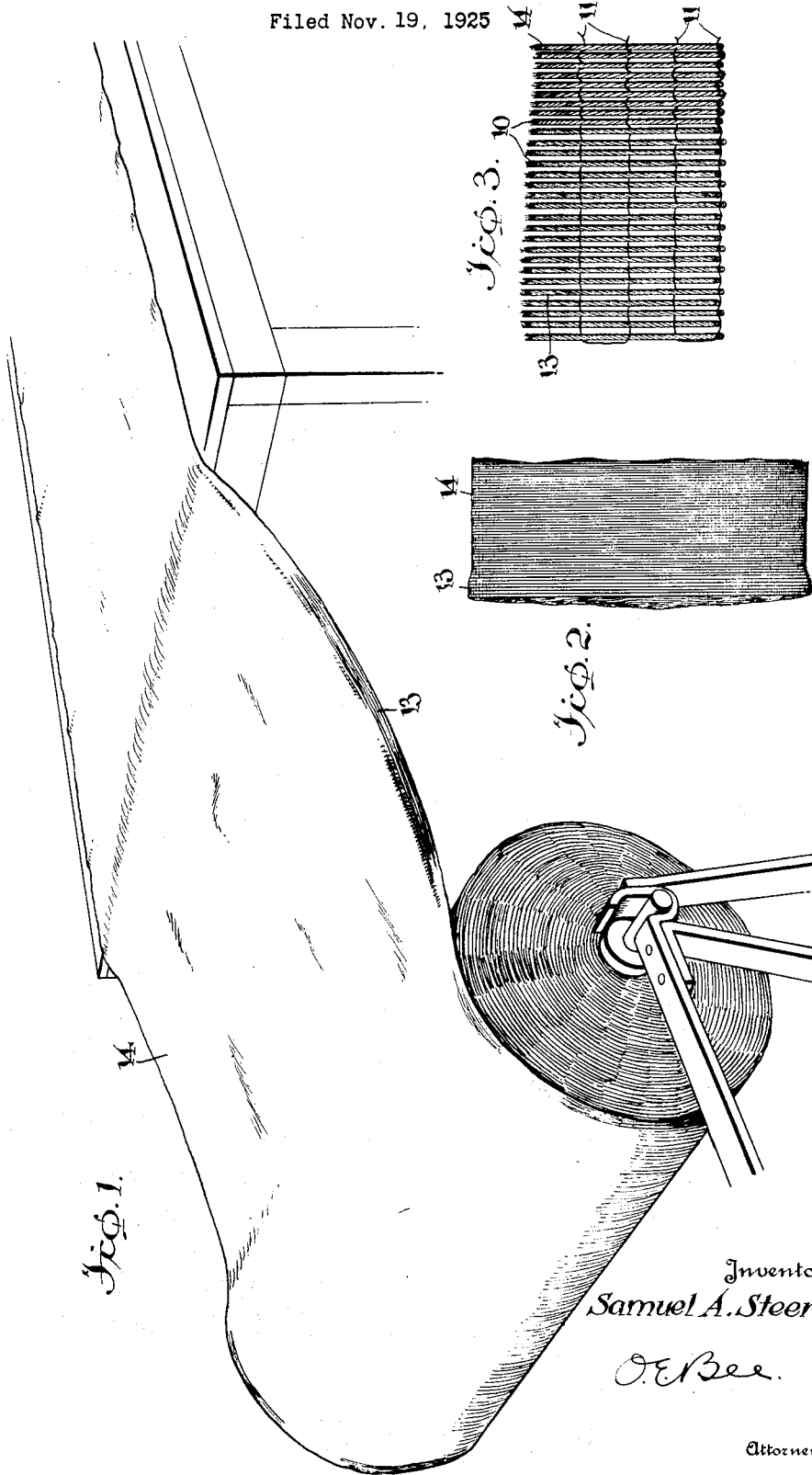
Inventor
Samuel A. Steere,
Attorney Patented July 12, 1927.

1,635,196

UNITED STATES PATENT OFFICE.

SAMUEL A. STEERE, OF AKRON, OHIO, ASSIGNOR TO THE GOODYEAR TIRE & RUBBER COMPANY, OF AKRON, OHIO, A CORPORATION OF OHIO.

CORD TIRE FABRIC.

Application filed November 19, 1925. Serial No. 70,095.

My invention relates to the fabrication and processing of cord tire fabric and it is particularly related to a method whereby more accurate cutting thereof may be effected.

The object of my invention is to provide a method of manipulating a textile material which is to be utilized in the carcass of pneumatic tires whereby more accurate and uniform cutting of plies on the bias cutter is made possible.

Large quantities of cord fabric are utilized in pneumatic tires as a reinforcing medium. After it is spun and woven at the textile mills it is impregnated with a rubber composition either by a calendering operation or by dipping the cords in latex or a rubber cement. The resultant product is then cut on the bias and built into the tire.

The cutting operation is most universally done on a Spadone bias cutter and while this machine may be graduated to provide any predetermined width, it is desirable that at the chosen setting the ply width be uniform. Obviously, if one end of the ply is substantially wider than the other, it can only be used in a tire which requires a width not greater than that of the narrower end. This results in considerable waste. It is not uncommon even when the machine is in perfect working order to cut plies having an overall variation of substantially an inch. It will be apparent that this deviation results in a serious loss to a tire manufacturer.

Formerly, it was believed that the inaccurate cutting was chargeable to defects in the cutting machine. It has been observed, however, that one roll of fabric may cut well, that is the variation will not exceed a quarter of an inch, and the next roll will vary several times that amount. From this it can be concluded that some factor other than the bias cutting mechanism has considerable bearing on uniformity of the ply widths.

I have discovered that rolls which result in plies of inaccurate widths are rolls, one or both of whose selvage portions are under considerably greater tension than the cords of the body portion of the fabric for by utilizing rolls which are not so characterized, better results are obtained.

A cord fabric having non-uniform portions is often designated as uneven or "baggy" fabric. A fabric so characterized cuts poorly, that is, the resulting plies are of non-uniform width. For this reason, the mill product is carefully inspected and, in the event that the characteristic is too pronounced, the roll is rejected.

I have found that a cord fabric wherein the individual cords are under substantially uniform tension before processing often cuts poorly. Moreover, it appears that the cords of the selvage portion tighten during the processing operation more than those of the body or central portion of the fabric. According to my invention, therefore, I assemble the cords which form the fabric in such manner as to allow for this take-up or tensioning that is incident to the processing prior to the bias cutting operation.

A better understanding of my invention may be had by referring to the drawings, in which:

Fig. 1 is a perspective view of a roll of fabric partially unwound, embodying the principles of my invention, and shows the loose or "dog eared" selvage portion;

Fig. 2 is a fragmentary plan view of a cord fabric illustrating the increase in diameter of the selvage portion; and Fig. 3 is a perspective view on an enlarged scale of a piece of fabric and sets forth the contrast between the cords of the body portion and those of the selvage.

The fabric, that perhaps is most commonly employed in constructing pneumatic tires, consists of a plurality of warp cords 10 running longitudinally which are held in position by a fine weft yarn 11 that is interwoven perpendicularly to the warp. In weaving the fabric, the manufacturer attempts to keep the warp under uniform tension throughout the sheet. This practice is in decided contrast to a cord fabric constructed according to the principles of my invention, wherein the cords of the selvage portion 13 are under substantially less tension than those of the body portion 14. This is more clearly illustrated in Fig. 3, wherein it will be noted that the weft passes around those cords of the body portion which are more taut, but not so in the selvage portion where the warp is relatively loose. The same characteristic is evidenced in Fig. 1 where the selvage portion hangs loosely in a "dog eared" fashion and in Fig. 2, it will be noted, that the looser warp cords have formed an enlarged diameter at the ends of the rolls.

After the rolls of fabric, as illustrated in Fig. 1, have been impregnated with rubber, as for example by a calendering operation, the looser warp cords have a tendency to tighten. The processed fabric so constructed is even and cuts uniformly. In order to effect the desired result, however, it is necessary that the selvage portion be loose or "dog eared", which would, according to present day practice, be rejected by the tire manufacturer as being too "baggy". The degree of slackness may be varied within wide limits and will depend in part upon the character of the cord, the surrounding moisture and temperature conditions, as well as the characteristics of the calendering or dipping operations. I have found that if the selvage cords contain about one percent greater length than those of the body portion, the Spadone bias cutter will cut the resultant product successfully with but a quarter of an inch tolerance. Of course the tolerance will vary, depending upon the width of ply. However, no difficulty has been experienced in cutting plies seventeen inches wide within an over-all variation of a quarter of an inch.

The results hereinabove given are merely exemplary and they should not be interpreted as qualifying the invention, for the reason that they are dependent in part upon the operating characteristics and condition of the machine. They were obtained however, upon the same machine and at substantially the same time. For this reason they are comparable.

It should be understood that the invention is not limited to a cord tire fabric, the selvage of which is woven with any particular degree of looseness or a fabric wherein a weft is employed, inasmuch as the weftless fabric may likewise be subjected to the principles hereinabove set forth. Thus, although I have described the application of the principles of my invention to a single embodiment, it will be apparent to those skilled in the art that it may be subjected to many modifications, and I desire therefore that limitations be imposed only in accordance with prior art and the appended claims.

What I claim is:

1. That step in the fabrication and processing of cord tire fabric prior to the bias cutting operation which comprises weaving in substantially one per cent more cord in the selvage than the body portion of the fabric.

2. That step in the fabrication and processing of cord tire fabric prior to the bias cutting operation which comprises assembling substantially one per cent more cord in the selvage than in the body portion of the fabric.

3. A method of obviating baggy cord fabric resulting in inaccurate cutting that comprises assembling a cord fabric wherein the selvage cords are under substantially less tension than those in the body portion, which are under uniform tension.

4. A cord tire fabric, the cords of whose selvage portion have substantially one per cent greater length than those of the body portion.

In witness whereof, I have hereunto signed my name.

SAMUEL A. STEERE.